United States Patent
Dickie et al.

[11] Patent Number: 6,095,271
[45] Date of Patent: Aug. 1, 2000

[54] BATTERY MOUNTING SYSTEM FOR A POWERED WHEELCHAIR

[75] Inventors: Paul C. Dickie, Clovis, Calif.; Darin J. Trippensee, Boulder, Colo.

[73] Assignee: Sunrise Medical HHG Inc., Longmont, Colo.

[21] Appl. No.: 09/192,005

[22] Filed: Nov. 13, 1998

Related U.S. Application Data

[63] Continuation-in-part of application No. 09/166,829, Oct. 5, 1998.
[60] Provisional application No. 60/061,709, Oct. 6, 1997.

[51] Int. Cl.⁷ .................................................. B60R 16/04
[52] U.S. Cl. .......................... 180/68.5; 180/907; 439/500
[58] Field of Search .................................. 180/65.5, 907, 180/68.5; 439/500

[56] References Cited

U.S. PATENT DOCUMENTS

| | | | |
|---|---|---|---|
| 3,882,949 | 5/1975 | Anderson | 180/8 A |
| 3,896,891 | 7/1975 | Miltenburg et al. | 180/6.5 |
| 4,386,672 | 6/1983 | Coker | 180/13 |
| 4,455,031 | 6/1984 | Hosaka | 280/242 |
| 4,598,921 | 7/1986 | Fenwick | 280/242 |
| 4,960,287 | 10/1990 | Lautzenhiser et al. | 280/304.1 |
| 4,967,864 | 11/1990 | Boyer et al. | 180/65.1 |
| 5,097,789 | 3/1992 | Oka | 114/363 |
| 5,125,468 | 6/1992 | Coker | 180/13 |
| 5,156,226 | 10/1992 | Boyer et al. | 180/65.1 |
| 5,161,630 | 11/1992 | Garin, III et al. | 180/65.2 |
| 5,552,734 | 9/1996 | Goertzen | 439/500 |

*Primary Examiner*—Christopher P. Ellis
*Assistant Examiner*—Rashmi Sharma
*Attorney, Agent, or Firm*—MacMillan, Sobanski & Todd, LLC

[57] ABSTRACT

A wheelchair battery mounting system comprises a battery box including a battery box bottom and a battery box lid. The front end of the battery box lid is engageable with the front end of the battery box bottom. The rear end of the battery box bottom is fixed relative to the wheelchair frame. The rear end of the battery box lid is releasably engageable with wheelchair frame to fix the rear end of the battery box lid relative to the rear end of the battery box bottom. The rear end of the battery box bottom may be fixed relative to the rear end of a battery box support. The battery box support may comprise braces each having a front and rear end respectively attached to a front and rear cross tube of the wheelchair. The battery box bottom may have a stepped profile that complimentary in shape to a stepped profile of the battery box lid. A wheelchair may be comprised of a battery mounting system as set forth above.

20 Claims, 9 Drawing Sheets

BATTERY MOUNTING SYSTEM FOR A POWERED WHEELCHAIR

CROSS-REFERENCE TO RELATED APPLICATIONS

This application claims the benefit of U.S. Provisional application Ser. No. 60/061,709, filed on Oct. 6, 1997, This Application is a continuation-in-part of Ser. No. 09/166,829, filed on Oct. 5, 1998.

TECHNICAL FIELD

This invention relates in general to wheelchairs and, in particular, to motorized wheelchairs powered by a battery. More particularly, this invention pertains to a wheelchair battery mounting system that provides improved ease in installing and removing a battery from a wheelchair.

BACKGROUND OF THE INVENTION

Motorized wheelchairs are commonly powered with a pair of electric motors. A rechargeable battery is typically mounted beneath the wheelchair seat and electrically connected to the electric motors. It would be advantageous if the battery could be mounted in a readily removable manner so that the battery could be removed from the wheelchair, such as for transporting or recharging the battery. Further, it would be helpful if the battery could be secured so that it is immobile once installed on the wheelchair.

Conventional batteries are supported on power wheelchairs by a battery box that typically sets in a battery support pan mounted at the rear end of the wheelchair. The battery box generally includes a battery box bottom and a battery box lid. The battery box bottom forms a battery compartment area for receiving and containing a battery. The battery box lid forms a closure for enclosing the battery in the battery compartment area. The battery box bottom and lid are typically held together by straps that generally surround the battery box. The straps are commonly buckled together by buckles that are ordinarily of a snap-type construction. The straps and buckles can often be cumbersome to a wheelchair occupant. A more user-friendly and cost-effecting battery mounting system is desired. Elimination of the cumbersome straps and buckles can prove to provide easier access and thereby produce a more user-friendly battery mounting system. The elimination of buckles and straps can also result in the use of fewer parts. This, in turn, can result in a less expensive battery mounting system.

SUMMARY OF THE INVENTION

The above object as well as other objects not specifically enumerated are achieved by a battery mounting system for a motorized wheelchair. The battery mounting system includes a battery box comprised of a battery box bottom and lid. The battery box bottom is structured and dimensioned to support a battery. A battery box support comprising a battery cage is provided to support the battery box bottom relative to the rear end of the wheelchair frame. The battery box lid slidably engages the battery box bottom. In particular, the front end of the battery box lid engages the front end of the battery box bottom, forming an interference fit between the front end of the battery box bottom and the front end of the battery box lid. The rear end of the battery box bottom is fixed relative to the wheelchair frame. The rear end of the battery box lid may be releasably fixed relative to the wheelchair frame to fix the rear end of the rear end of the battery box lid relative to the rear end of the battery box bottom.

Another embodiment of the invention includes a battery box support structured and dimensioned to support the battery box bottom. The battery box support has a rear end. The rear end of the battery box bottom is substantially fixed relative to the rear end of the battery box support.

Another embodiment of the invention includes a battery box support which comprises a pair of substantially longitudinally extending braces. Each one of the braces has a front end and a rear end. The front end of each one of the braces is attached to the wheelchair front cross tube. The rear end of each one of the braces is attached to the wheelchair rear cross tube.

Another embodiment of the invention includes a battery box bottom that has an upper edge having a stepped profile defined in part by an elevated portion of the upper edge. The battery box lid has a lower edge having a stepped profile defined in part by an elevated portion of the lower edge. The stepped profile defined in part by the elevated portion of the upper edge of the battery box bottom is complimentary in shape to that of the stepped portion defined in part by the elevated portion of the lower edge of the battery box lid.

Another embodiment of the invention further comprises a frame bracket attached to one of the wheelchair side frames and an upper cross tube fastened to the rear end of the battery box lid. An end of the upper cross tube supports the coupling element. The coupling element is engageable with said frame bracket to hold the rear end of the battery box lid in a substantially fixed position relative to at least one of the side frames.

Another embodiment of the invention includes a wheelchair that has a pair of space apart side frames and a front cross tube and a rear cross tube spanning between the side frames. A battery mounting system comprising a batter box including a battery box bottom that is substantially fixed relative to the wheelchair side frames. A battery box lid has a front end that is engageable with the front end of the battery box bottom. A coupling element couples the rear end of the battery box lid to the side frames so as to hold the rear end of the battery box lid in a substantially fixed position relative to the rear end of the battery box bottom.

DETAILED DESCRIPTION OF THE INVENTION

Figure 1:
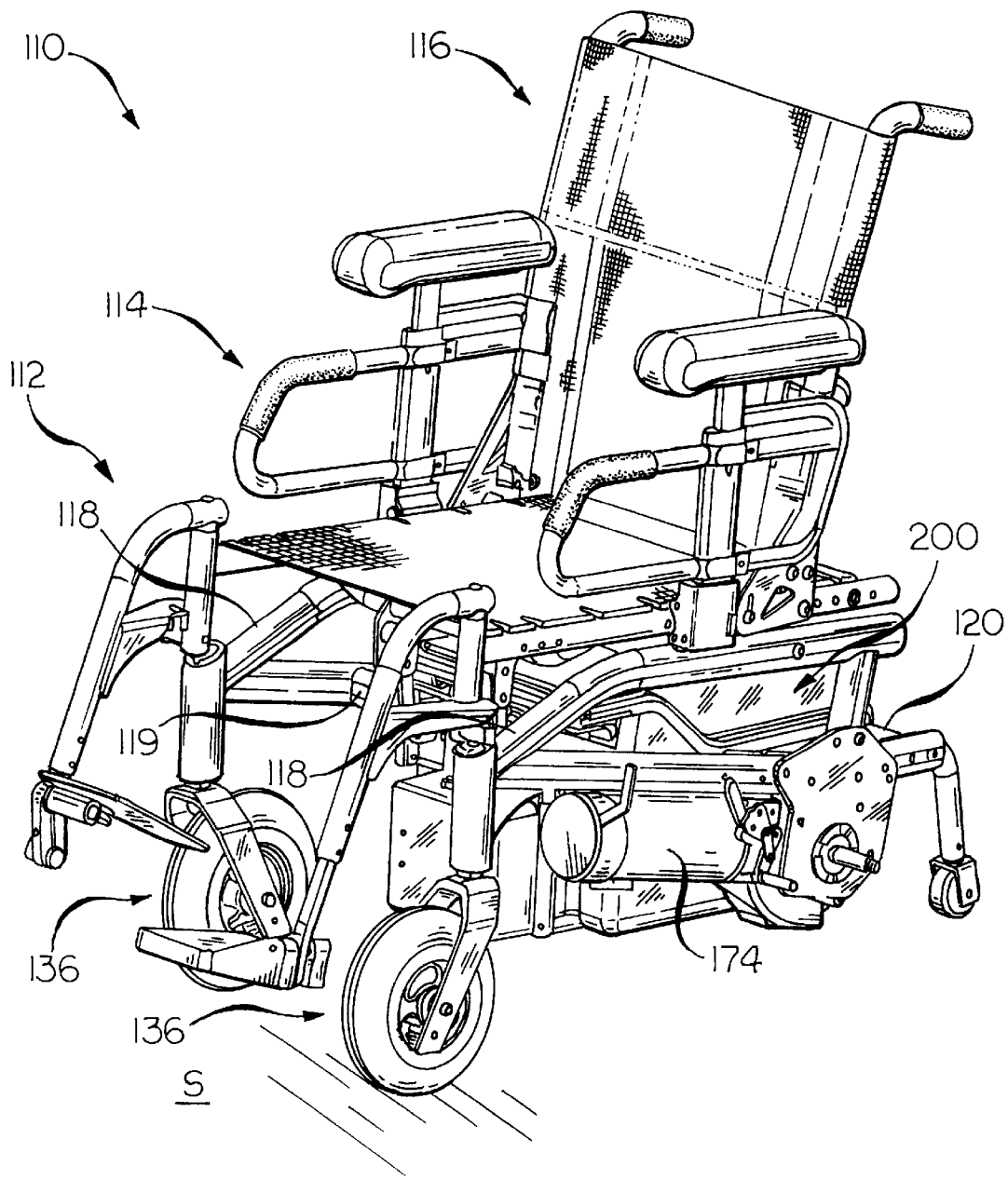
FIG. 1 is a front perspective view of a motorized wheelchair having a battery mounting system according to the invention.
Figure 2:
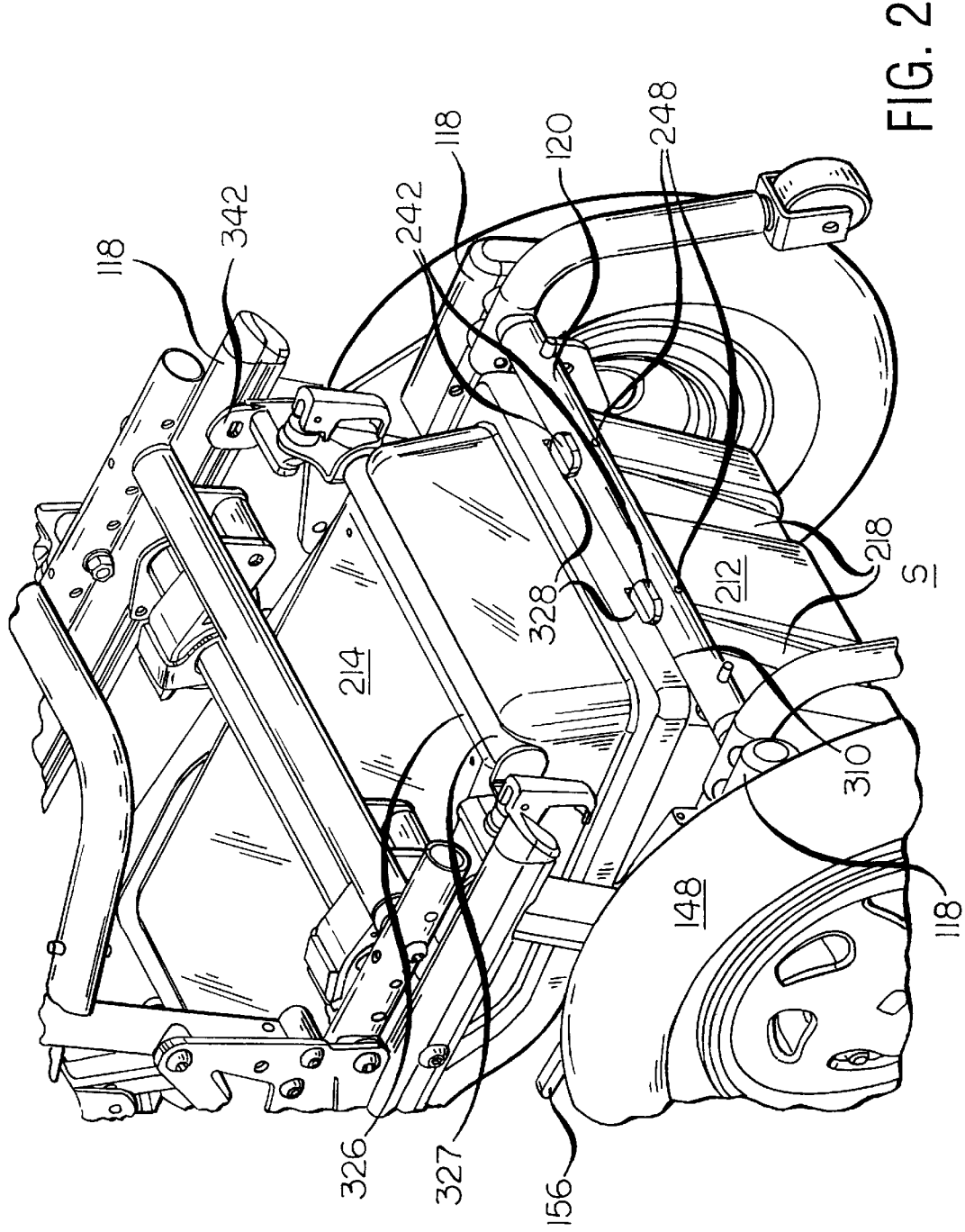
FIG. 2 is an enlarged rear perspective view of the wheelchair and battery mounting system shown in FIG. 1.

There is illustrated in FIGS. 1 and 2 a wheelchair 110 comprising a base 112 and a seat frame 114 and backrest 116 supported by the base 112. The base 112 comprises a pair of side frames 118 and lateral struts or cross tubes 119 and 120 spanning between, and connected to, the side frames 118. A pair of front caster/fork assemblies 136 supports a front portion of the wheelchair 110 on a supporting surface S. As illustrated in FIG. 2, a pair of rear/drive wheels 148 supports a rear portion of the wheelchair 110 on the supporting surface S. The wheelchair 110 is driven by the rear wheels 148 and is maneuvered by differentially driving the rear wheels 148. Independent motors differentially drive the rear wheels 148. The motors 174 drive each rear wheel 148.

The motors 174 are operatively controlled by a main electronic control 181, which, in turn, may be controlled by a joystick 183 (both schematically shown in FIG. 11) or some other device responsive to commands by the wheelchair occupant. The motors 174 are energized by a power source, such as the battery B shown in FIG. 5. The main electronic control 181 is electrically connected between the motors 174 and the power source to energize and interrupt energy to the motors 174 to operate the rear wheels 148 to maneuver the wheelchair 110 as desired by the wheelchair occupant. Electrical conductors, such as the electrical conductors schematically illustrated in FIG. 11, may accomplish this electrical connection.

Figure 3:
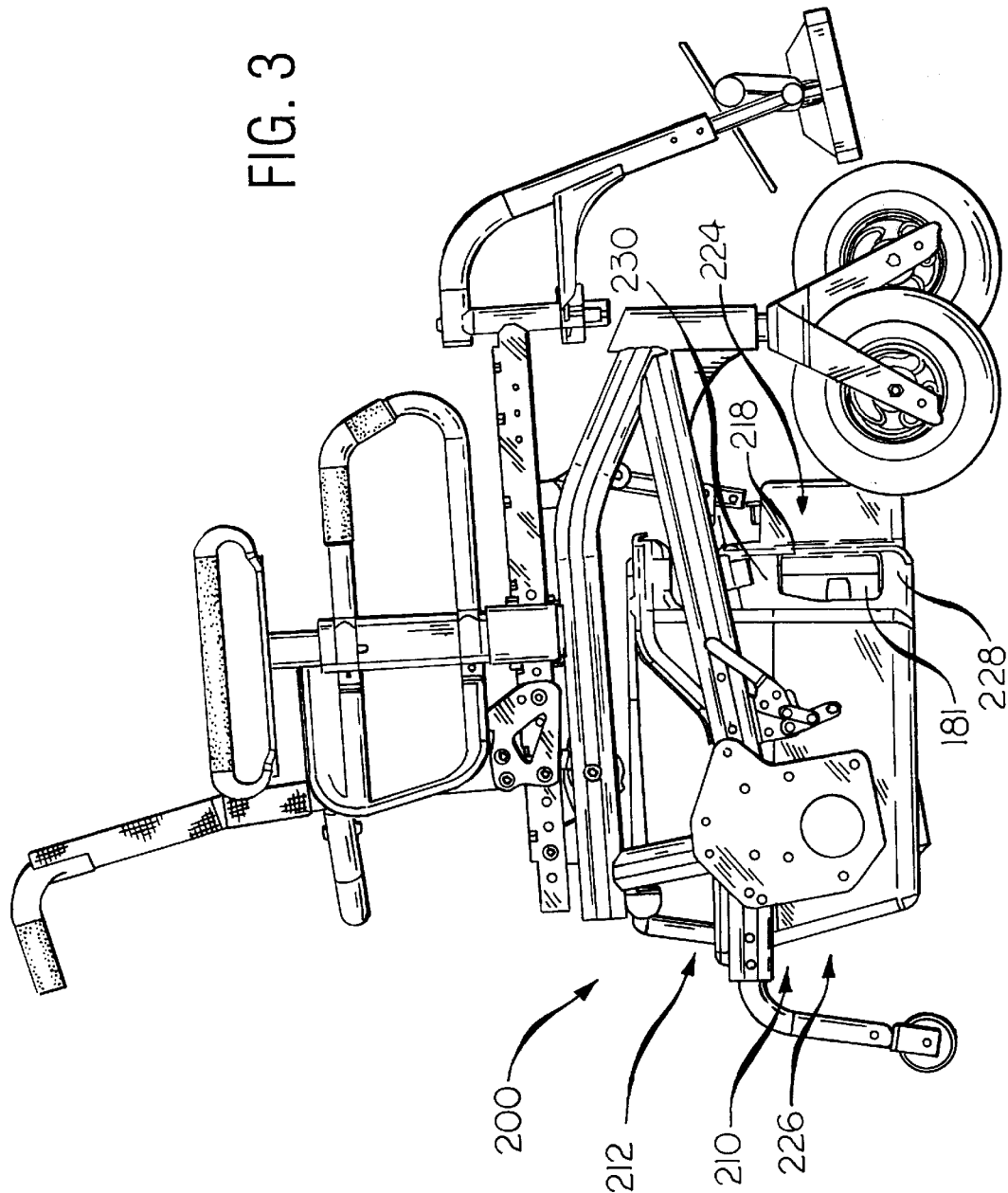
FIG. 3 is a side elevational view of the wheelchair and battery mounting system shown in FIG. 1.
Figure 4:
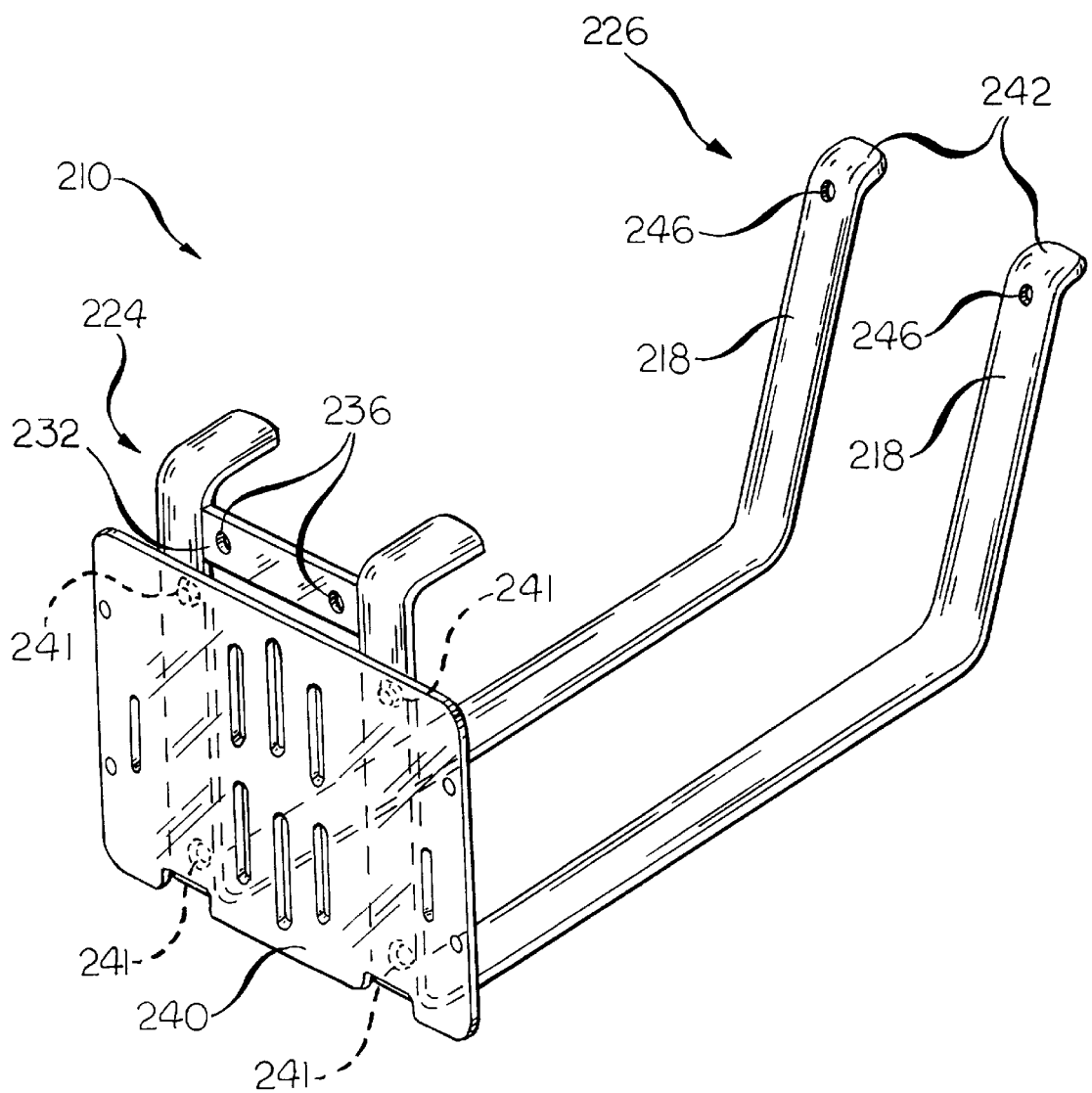
FIG. 4 is a front perspective view of a battery box support of the invention.
Figure 5:
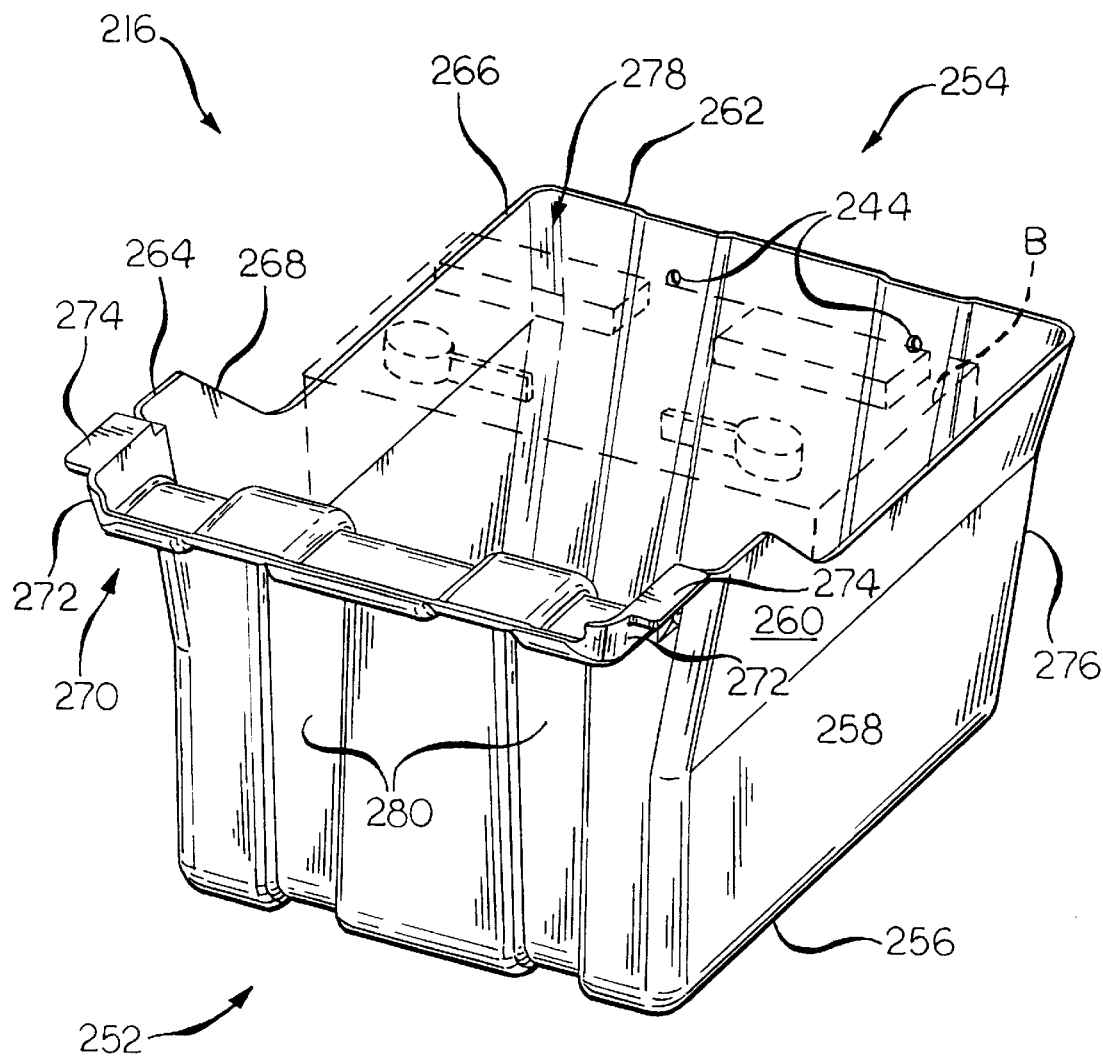
FIG. 5 is a front perspective view of the battery box bottom of the invention with a battery shown in broken lines.

The present invention, as shown in FIG. 3, includes a battery mounting system 200 comprising a battery box support which includes a battery cage 210 for supporting a battery box 212, which, in turn, supports one or more batteries B (schematically shown in FIG. 5). Although the battery box support is shown as a battery cage 210, the phrase "battery box support" should be understood to mean any suitable structure for supporting the battery box 212 relative to the wheelchair 110. As shown in FIG. 4, the battery cage 210 comprises a pair of longitudinally extending braces 218. The longitudinally extending braces 218 are supported by a front cross tube 119 (shown in FIG. 1) and a rear cross tube 120 (shown in FIG. 2). In particular, the front end 224 of the longitudinally extending braces 218 is supported by the front cross tube 119 and the rear end 226 of the longitudinally extending braces 218 is supported by the rear cross tube 120.

As illustrated in FIG. 3, the front end 224 of the longitudinally extending braces 218 extends forwardly beyond the battery box 212. The front end 224 of the longitudinally extending braces 218 bends first upward and then rearward to form a box configuration 228 between the front end 224 of the longitudinally extending braces 218 and the battery box 212. A mounting plate 240 is attached to the longitudinally extending braces 218 forward of the box configuration 228. The mounting plate 240 is dimensioned and configured to support the auxiliary components, such as the battery box bottom (216) and battery box lid (214) shown. The front end 224 of the longitudinally extending braces 218 is provided with holes 241, as shown in FIG. 4. The holes 241 are engageable with fasteners (not shown) for fastening main electronic control 181 to the front end 224 of the longitudinally extending braces 218. As is clearly shown in FIG. 3, the box configuration 228 may define a space 230 for receiving the main electronic control 181. It is preferred that the space 230 defined by the box configuration 228 also accommodate electrical conductors 231 that provide electrical connections between the main electronic control 181, the battery B, the joystick 183, and the motors 174 (all schematically illustrated in FIG. 11).

As shown in FIG. 4, a laterally extending bracket 232 spans between the front ends 224 of the longitudinally extending braces 218. The front cross tube 119 (shown in FIG. 1) and the laterally extending bracket 232 have co-aligning holes (only the holes 236 in the laterally extending bracket 232 are shown). Fasteners (not shown) are engageable with the holes in front cross tube 119 and holes 236 in the longitudinally extending braces 218 to fasten the front end 224 of the longitudinally extending braces 218 to the front cross tube 119.

Holes 244, 246 and 248 (shown in FIGS. 5, 4 and 2, respectively) are provided in the battery box bottom 216, the rear end 226 of the longitudinally extending braces 218, and the rear cross tube 120. The holes 244, 246 and 248 co-align to receive fasteners (not shown). The fasteners are engageable with the co-aligning holes 244, 246 and 248 to fasten together the battery box bottom 216, the rear end 226 of the longitudinally extending braces 218, and the rear cross tube 120. The rear end 226 of each longitudinally extending brace 218 may be provided with a hook portion 242 to provide sufficient structure about the hole 246 in rear end 226 of the longitudinally extending braces 218. The hook portion 242 can be dimensioned and configured to hook over, or conform closely to, a lower rear cross tube 120. Although the front end 224 of the longitudinally extending braces 218 is not connected to the battery box 212, it is to be understood that such a connection may be made if desired.

The forgoing description of the battery cage 210 and the manner of attaching the battery cage 210 is for illustrative purposes. It is to be understood that other battery cage configurations and methods of attachment may be suitable for carrying out the invention.

As shown in FIG. 5, the battery box bottom 216 has a front end 252 and a rear end 254, and comprises a base 256 and a peripheral wall 258 extending upwardly from the base 256. An upper portion of the peripheral wall 258 defines a flared upper brim 260. The flared upper brim 260 has an upper edge 262. The upper edge 262 has a stepped profile. That is to say, the upper edge 262 has a forwardly disposed elevated portion 264, a rearwardly disposed depressed portion 266, and a sloped portion 268 progressing between the elevated portion 264 and the depressed portion 266.

The front end 252 of the battery box bottom 216 includes a forwardly extending portion 270. The forwardly extending portion 270 has opposing sides 272. Interference pieces, such as the opposing tabs 274 shown, extend from the opposing sides 272. The opposing tabs 274 will be described in further detail in the description below.

The rear end 254 of the battery box bottom 216 has an outwardly angled rear portion 276 and defines a battery compartment area 278 for receiving a battery B. The peripheral wall 258 has a flared upper brim 260 to improve the handling of a battery B in the battery box bottom 216. The outwardly angled rear portion 276 is angled to permit the battery B to be inserted and removed from the rear end 254 of the battery box bottom 216 with greater ease.

Spaced-apart longitudinally extending grooves 280 are provided in the battery box bottom 216. The grooves 280 are in the front end 252, the base 256, and the rear end 254 of the battery box bottom 216. The grooves 280 in the base 256 and the rear end 254 of the battery box bottom 216 are preferably dimensioned and configured to receive the longitudinally extending braces 218 to provided a mating relationship between the battery cage 210 and the battery box bottom 216.

Figure 6:
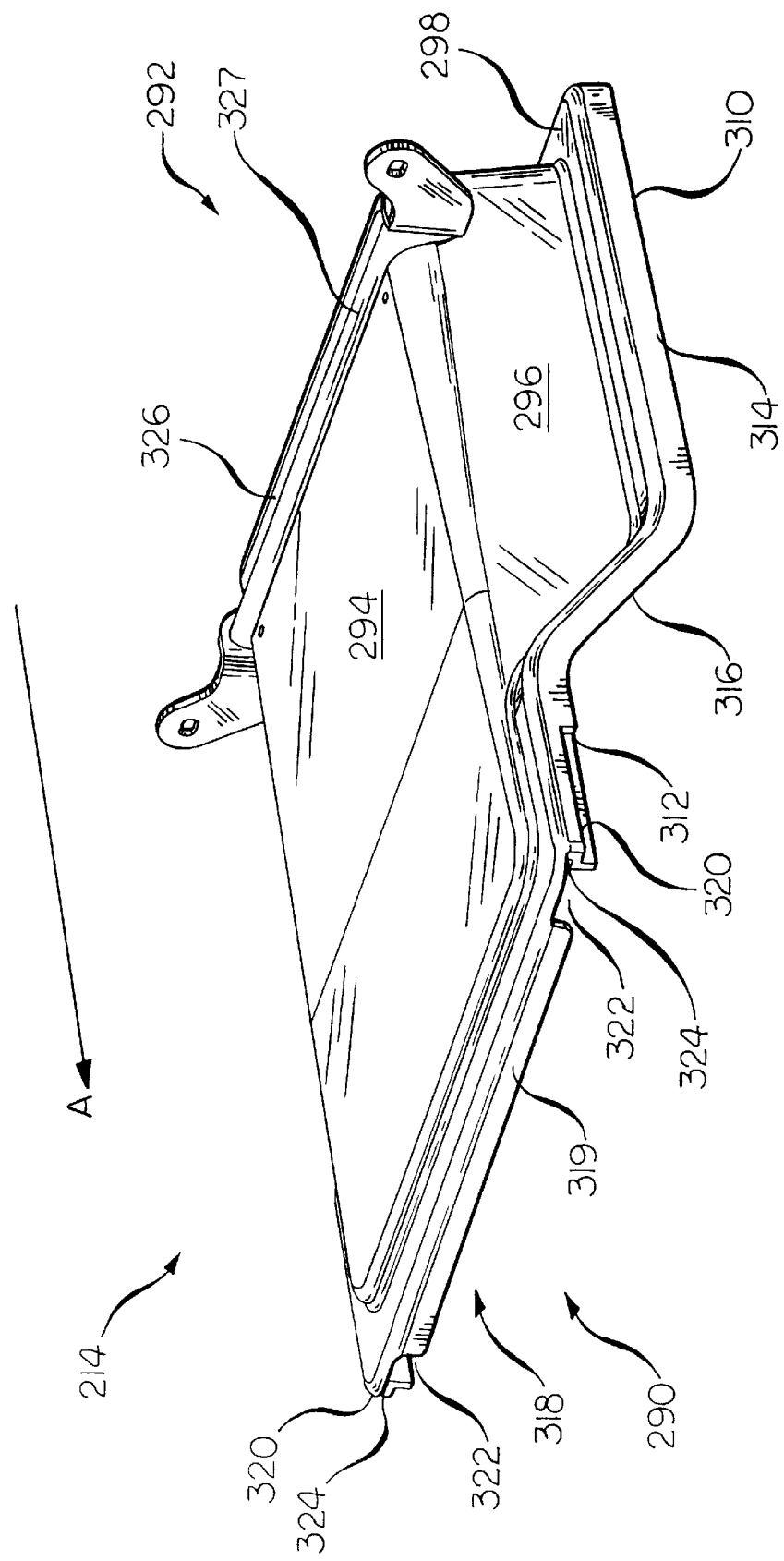
FIG. 6 is a front perspective view of the battery box lid of the invention.
Figure 7:
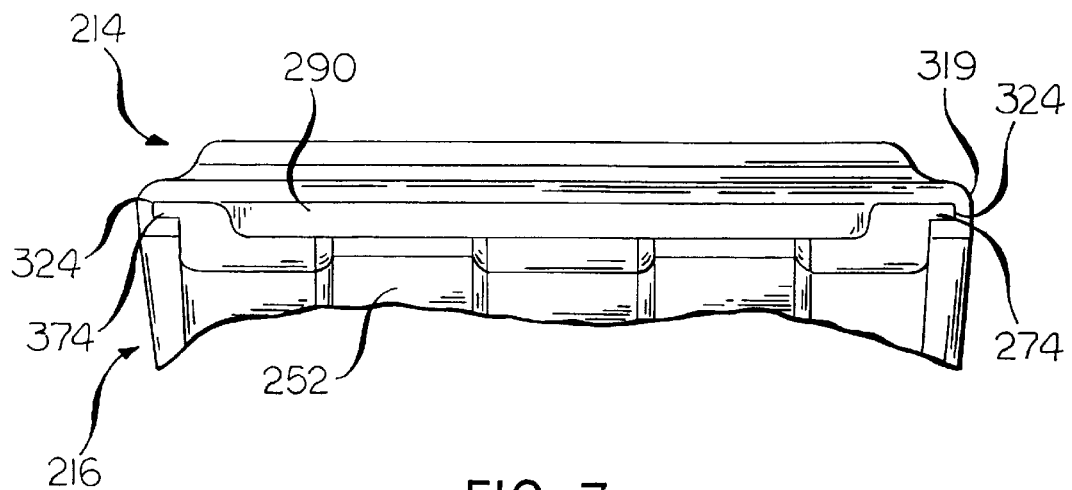
FIG. 7 is a partial front elevational view of the battery box bottom and the battery box lid showing the interference fit between the battery box bottom and the battery box lid.

As shown in FIG. 6, the battery box lid 214 has a front end 290 and a rear end 292, and comprises a top 294 and peripheral walls 296 extending substantially downward from the top 294. A lower rear portion of the peripheral walls 296 forms a lower rear rim 298. The battery box lid 214 also has a lower edge 310. The lower rear rim 298 is defined in part by the lower edge 310. The lower edge 310 has an elevated portion 312, a depressed portion 314, and a progressive slope portion 316. The depressed portion 314 defines the lower extremity of the lower rear rim 298. The progressive slop portion 316 progresses between the elevated portion 312 and the depressed portion 314 of the lower edge 310 to form an edge having a stepped profile that corresponds or complements the stepped profile of the upper edge 262 of the battery box bottom 216. A forwardly extending portion 318 forms a lower front rim 319. The elevated portion 312 of the lower edge 310 defines the lower extremity of the lower front rim 319. The forwardly extending portion 318 has opposing sides 320. Openings 322 are provided in the front of the lower front rim 319. The lower front rim 319 is structured and dimensioned to form interference members, such as the opposing channels 324 shown at the opposing sides 320 of the forwardly extending portion 318. The openings 322 communicate with the opposing channels 324. As shown in FIG. 7, the opposing channels 324 are dimensioned and configured to receive the opposing tabs 274 extending from the opposing sides 272 of the forwardly extending portion 270 of the battery box bottom 216. Upon sliding the battery box lid 214 adjacent to the battery box bottom 216 in the direction of the arrow "A" (shown in FIG. 6), the opposing tabs 274 may pass through the openings 322 to slidably engage the opposing channels 324 defined by the lower front rim 319. An interference fit is formed between the opposing tabs 274 and the opposing channels 324. The cooperating engagement between the opposing tabs 274 and the opposing channels 324 functions to releasably couple the front end 290 of the battery box lid 214 to the front end 252 of the battery box bottom 216.

Referring back to FIG. 6, the battery box lid 214 is farther shown to include a trough 326. The trough 326 is formed in the top 294 of the battery box lid 214 proximate the rear end 292 of the battery box lid 214. The trough 326 is dimensioned and configured to partially receive a laterally extending cross tube 327. The cross tube 327 is preferably fastened to the battery box lid 214 in the trough 326 by fasteners (not shown).

The rear end 292 of the battery box lid 214 is provided with spaced-apart reliefs or cutouts reliefs 328 (shown in FIG. 2). The reliefs 328 are provided to permit the battery box lid 214 to be fastened to the battery box bottom 216 without producing interference between the hook portions 242 of the longitudinally extending braces 218 and the lower edge 310 at the rear end 292 of the battery box lid 214. Note that these reliefs 328 may be omitted if the longitudinally extending braces 218 are not provided with hook portions 242.

Figure 8:
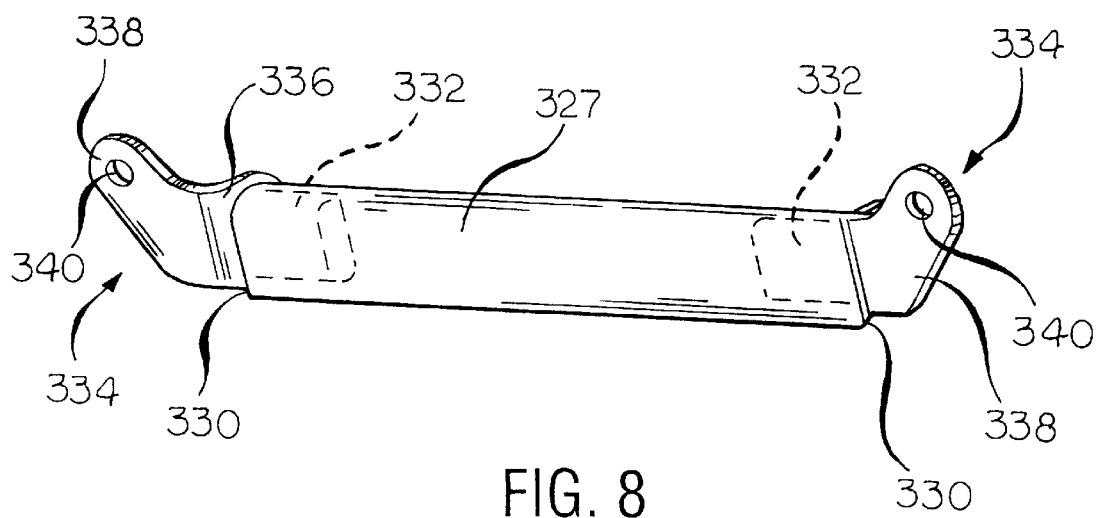
FIG. 8 is a front perspective view of a rear cross tube in the invention supporting opposing lid brackets for use with the invention.

As shown in FIG. 8, the cross tube 327 fastened in the trough 326 of the battery box lid 214 has opposing open ends 330 for receiving a bracket plug 332. The bracket plug 332 supports an L-shaped battery box lid bracket 334. The battery box lid bracket 334 has a first leg 336 and a second leg 338. The bracket plug 332 extends substantially perpendicularly from the first leg 336 of the battery box lid bracket 334. A hole 340 is provided in the second leg 338 of the battery box lid bracket 334. The hole 340 is provided to support a coupling element 354, shown in FIGS. 9 and 10. The purpose of the coupling element 354 will become more apparent in the description that follows.

Figure 9:
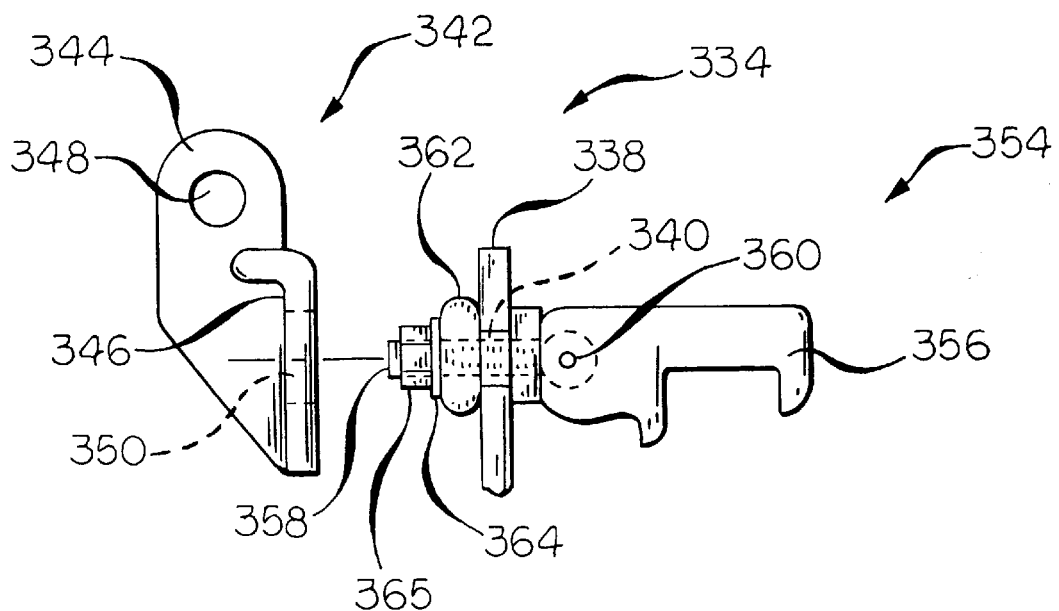
FIG. 9 is an enlarged side elevational view of a frame bracket and a coupling element of the invention.

The coupling element 354 cooperates with an L-shaped frame bracket 342, shown in FIG. 9. The frame bracket 342 is attached to the side frame 118 of the wheelchair 110, as shown in FIG. 2. Referring back to FIG. 9, the frame bracket 342 illustrated has a first leg 344 and a second leg 346. The first leg 344 is provided with a hole 348. Likewise, the second leg 346 is provided with a hole 350. The hole 348 in the first leg 344 is provided to receive a fastener (not shown). The fastener is insertable into and through the hole 348 in the first leg 344 and engages the side frame 118 of the wheelchair 110 to secure the frame bracket 342 to the side frame 118 of the wheelchair 110. The hole 350 in the second leg 346 is arranged and dimensioned to receive the coupling element 354. The coupling element 354 is engageable with the hole 350 in the second leg 346 to couple the battery box lid bracket 334 to the frame bracket 342. This, in turn, couples the cross tube 327 fastened in the trough 326 of the battery box lid 214 to the side frames 118 of the wheelchair 110, which, in turn, releasably locks the battery box lid 214 in a fixed position relative to the side frames 118 of the wheelchair 110, and hence, relative to the battery box bottom 216.

Figure 10:
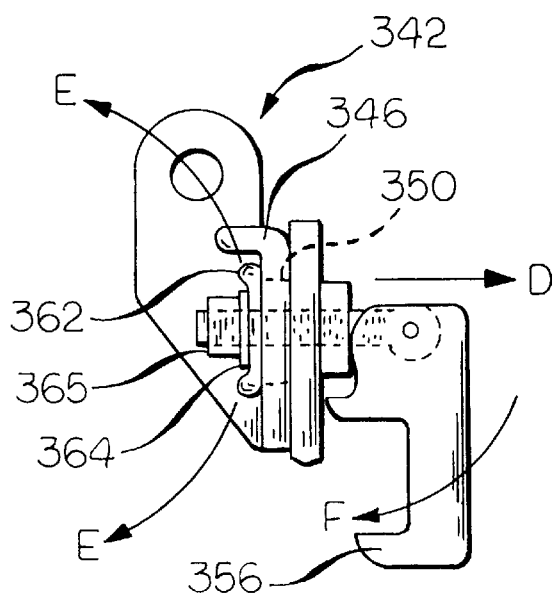
FIG. 10 is an enlarged side elevational view of the battery box lid bracket shown in FIG. 8 coupled to the frame bracket shown in FIG. 9 by the coupling element also shown in FIG. 9.

A Swell Latch® manufactured by Southco® in Bridgeport, N.J., U.S.A., is a suitable coupling element 354 for carrying out the instant invention. This coupling element 354, as shown in FIGS. 9 and 10, includes a cam lever 356 pivotally connected to a threaded stud 358 at a pivot point 360. The threaded stud 358 is insertable through the hole 340 in the second leg 338 of the battery box lid bracket 334 and supports a deformable ring 362 on a side of the second leg 338 opposite the cam lever 356. The deformable ring 362 is held on the threaded stud 358, and the cam lever 356, the threaded stud 358, and the deformable ring 362 are all coupled to the second leg 338 of the battery box lid bracket 334 by a washer 364 and a retaining nut 365.

The deformable ring 362, in a non-deformed condition, is insertable into the hole 350 in the second leg 346 of the frame bracket 342 until the battery box lid bracket 334 abuts the frame bracket 342. As illustrated in FIG. 10, the cam lever 356 is displaceable in the direction of the arrow "F" to compress the deformable ring 362. The displacement of the cam lever 356 in the direction of the arrow "F" displaces the washer 364 and retaining nut 365 in the direction of the arrow "D" which axially compresses the deformable ring 362 in the direction of the arrow "D". This causes the deformable ring 362 to expand radially outward in the direction of the arrows "E". In this expanded condition, the deformable ring 362 will not pass back through the hole 350 in the second leg 346 of the frame bracket 342 in a direction opposite the direction of the arrow "D". Hence, the deformable ring 362 is trapped and the battery box lid bracket 334 is fixed relative to the frame bracket 342. This, in turn, retains the battery box lid 214 in a fixed position relative to the side frames 118 of the wheelchair 110. Moreover, the battery box lid 214 is held in a fixed position relative to the battery box bottom 216, which is fixed relative to the side frames 118 of the wheelchair 110.

The retaining nut 365 is adjustable relative to the threaded stud 358 to adjust the compressive force of the cam lever 356 acting upon the deformable ring 362. By tightening the retaining nut 365, the compressive force of the cam lever 356 acting upon the deformable ring 362 increases. This causes the outward radial expansion of the deformable ring 362 to increase, which increases the ability of the deformable ring 362 to hold the battery box lid bracket 334 and the frame bracket 342 together, or reduces the risk of the brackets' 334 and 342 becoming disengaged.

In operation, the front end 224 of each longitudinally extending brace 218 is connected to the front cross tube front cross tube 119 (shown in FIG. 1). The battery box bottom 216 is inserted into the battery cage 210. The rear end 254 of the battery box bottom 216 and the rear end 226 of the battery cage 210 are connected to the rear cross tube 120, as shown in FIG. 2. A battery B (shown in FIG. 5) is insertable into the battery compartment area 278 of the battery box bottom 216 from the rear end of the wheelchair 110. As stated in the description above, the outwardly angled rear portion 276 of the peripheral wall 258 allows the battery B to be inserted into the battery compartment area 278 with great ease. Moreover, the flared upper brim 260 of the battery box bottom 216 permits the wheelchair occupant (not shown) to exercise greater control over the battery B while inserting the battery B into the battery compartment area 278.

Figure 11:
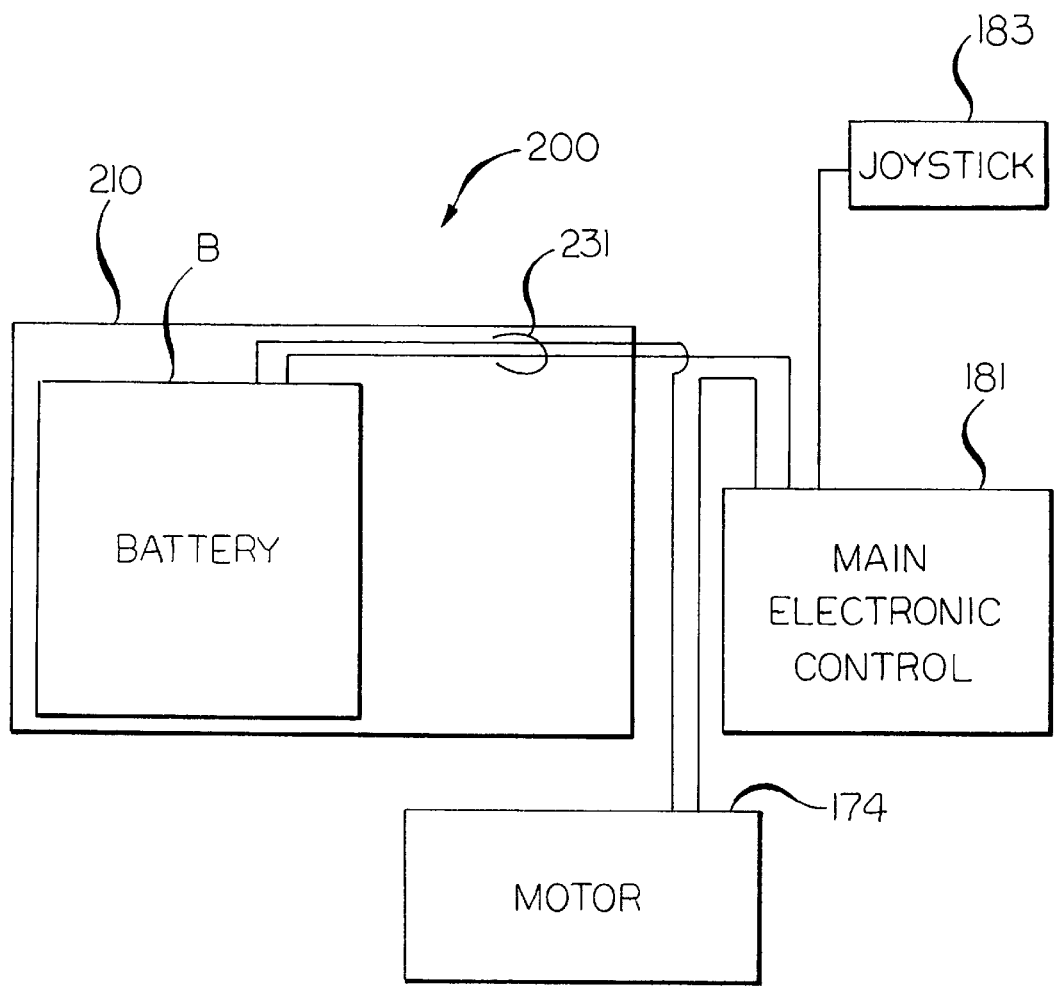
FIG. 11 is an environmental schematic representation of the battery mounting system of the invention.

The electrical conductors 231 are connectable between the terminals of the battery B, the main electronic control 181, and the motors 174, as schematically illustrated in FIG. 11. Note that the electrical conductors 231 may pass through the front end 252 of the battery box bottom 216, and, in particular, through the forwardly extending portion 270 of the battery box bottom 216. As described above, the space 230 defined by the box configuration 228 is preferably provided to accommodate the electrical conductors 231 (shown in FIG. 11) and the main electronic control 181 (also shown in FIG. 11). In particular, an upper portion of the space 230 accommodates the electrical conductors 231 (schematically illustrated in FIG. 11) and the connection of the electrical conductors 231 to the main electronic control 181. A lower portion of the space 230 is provided to receive main electronic control 181, as shown in FIG. 3. As described above, the main electronic control 181 is mountable to the front end 224 of the longitudinally extending braces 218. In this way, the forwardly extending portion 318 of the battery box lid 214 functions as a splash guard, as is clearly shown in FIG. 3, to protect the main electronic control 181 from spillage by, or fluids from, the wheelchair occupant.

With the electrical conductors 231 connected to the battery B, the battery box 212 may be closed. This is accomplished by slidably engaging the battery box lid 214 in a forward direction with the battery box bottom 216; that is to say, in the direction of the arrow "A", shown in FIG. 6. Note the elevated portion 312 of the front end 290 of the battery box lid 214 provides sufficient clearance to clear the battery B as the battery box lid 214 passes the battery compartment area 278 defined at the rear end 254 of the battery box bottom 216. The front end 290 of the battery box lid 214 engages the front end 252 of the battery box bottom 216. In particular, the opposing tabs 274 extending from the opposing sides 272 of the battery box bottom 216 engage the opposing channels 324 formed in the opposing sides 320 of the battery box lid 214. This forms an interference fit between the battery box lid 214 and the battery box bottom battery box bottom 216, as is illustrated in FIG. 7. As stated above, openings 322 (shown in FIG. 6) are provided in the front end 290 of the battery box lid 214 to permit passage of the opposing tabs 274 of the battery box bottom 212 into the opposing channels 324. Moreover, the reliefs 328 (shown in FIG. 2) in the rear end 292 of the battery box lid 214 permit top 294 of the battery box lid 214 to engage the rear end 254 of the battery box bottom 216 without encountering interference from the hook portions 242 of the longitudinally extending braces 218.

As the front end 290 of the battery box lid 214 engages the front end 252 of the battery box bottom 216, the battery box lid bracket 334 engages the frame bracket 342 as the coupling element 354 passes through the hole 350 in the frame bracket frame bracket 342, as shown in FIG. 10. With the battery box lid bracket 334 engaging the frame bracket 342, the cam lever 356 may be displaced in the direction of the arrow "F" to compress the deformable ring 362 in the direction of the arrows "D". In a compressed state, the radial dimensions of the deformable ring 362 increase in the direction of the arrows "E" to exceed the radial dimensions of the hole 350 in the frame bracket 342 to prevent the deformable ring 362 from escaping through the hole 350 in the frame bracket 342. This holds the battery box lid bracket 334 in engagement with the frame bracket 342.

The battery box lid bracket 334 may be more tightly engaged with the frame bracket 342 by adjusting the retaining nut 365; that is, by tightening the retaining nut 365 on the threaded stud 358. As stated above, this increases the compressive force applied against the deformable ring 362 by the cam lever 356. Compressing the deformable ring 362 with an increased compressive force causes the radial dimension of the compressed deformable ring 362 to increase, such as in the direction of the arrows "E".

Is should be understood that the terms "front", "forward", "rear", "vertical", and "horizontal" are orientation terms as related to the wheelchair 110 shown in FIG. 1 and described in the "BRIEF DESCRIPTION OF THE DRAWINGS." It should also be understood that the opposing tabs 274 and the opposing channels 324 shown are for illustrative purposes and that other configurations may be employed to provide and interference fit between the front end 290 of the battery box lid 214 and the front end 252 of the battery box bottom 216. Likewise, it should be understood that the coupling element 354 as well as the battery box lid bracket 334 and the frame bracket 342 are for illustrative purposes and that other coupling configurations may be suitable for carrying out the invention. Moreover, the configuration of the battery box lid 214 and the battery box bottom 216 are a preferred configuration but other configurations may fall within the scope of the invention.

The principle and mode of operation of this invention have been described in its preferred embodiment. However, it should be noted that this invention may be practiced otherwise than as specifically illustrated and described without departing from the scope of the invention.

What is claimed is:

1. A wheelchair battery mounting system for use with a wheelchair having side frames and front and rear cross tubes spanning between the side frames, said battery mounting system comprising:

a battery box including:
        a battery box bottom having a front end and a rear end, said battery box bottom being substantially fixed relative to the wheelchair side frames; and
        a battery box lid having a front end and a rear end, said front end of said battery box lid being engageable with said front end of said battery box bottom; and
    a coupling element structured and dimensioned to couple said rear end of battery box lid to said side frames so as to hold said rear end of said battery box lid in a substantially fixed position relative to said rear end of said battery box bottom.

2. The wheelchair battery mounting system of claim 1, further including:

a battery box support structured and dimensioned to support said battery box bottom, said battery box support comprising a front end and a rear end, said rear end of said battery box support being substantially fixed relative to the wheelchair side frames.

3. The wheelchair battery mounting system of claim 2, wherein said battery box support comprises:

a brace having a front end and a rear end, said front end of said brace being attachable to the wheelchair front cross tube and said rear end of said brace being attached to the wheelchair rear cross tube.

4. The wheelchair battery mounting system of claim 3, wherein said battery box bottom includes a groove structured and dimensioned to receive said brace.

5. The wheelchair battery mounting system of claim 2, wherein said battery box support comprises:

a pair of substantially longitudinally extending braces, each one of said braces having a front end and a rear end, said front end of each one of said braces being attachable to the wheelchair front cross tube and said rear end of each one of said braces being attached to the wheelchair rear cross tube.

6. The wheelchair battery mounting system of claim 5, wherein said battery box bottom includes a pair of grooves structured and dimensioned to receive said pair of braces.

7. The wheelchair battery mounting system of claim 1, wherein said front end of said battery box bottom has opposing sides and an opposing tab extending from each one of said opposing sides; and said front end of said battery box lid has opposing sides and a channel formed by each said opposing side of said battery box lid, said opposing tabs being engageable with said channels to engage said front end of said battery box bottom to said front end of said battery box lid.

8. The wheelchair battery mounting system of claim 1, wherein said battery box bottom has an upper brim; and said battery box lid has a lower rim, said rim being engageable with said brim to hold said battery box lid in a substantially fixed position relative to said battery box bottom.

9. The wheelchair battery mounting system of claim 1, wherein said battery box bottom has a rearwardly angled rear portion.

10. The wheelchair battery mounting system of claim 1, further including:

electrical conductors passing through said battery box bottom.

11. The wheelchair battery mounting system of claim 1, wherein said battery box has a forwardly extending portion defining an overhang, said forwardly extending portion being dimensioned and configured to form a splashguard.

12. The wheelchair battery mounting system of claim 1, wherein said battery box bottom has an upper edge having a stepped profile defined in part by an elevated portion of said upper edge; and said battery box lid has a lower edge having a stepped profile defined in part by an elevated portion of said lower edge, said stepped profile defined in part by said elevated portion of said upper edge of said battery box bottom being complementary in shape to that of said stepped portion defined in part by said elevated portion of said lower edge of said battery box lid.

13. The wheelchair battery mounting system of claim 1, further comprising:

an upper cross tube having an end; and a frame bracket attached to one of said side frames;

wherein said coupling element is supported by said end of said upper cross tube, said upper cross tube is fastened to said rear end of said battery box lid, and said coupling element is engageable with said frame bracket to hold said rear end of said battery box lid in a substantially fixed position relative to at least one of the side frames.

14. The wheelchair battery mounting system of claim 13, wherein said coupling element includes a lever and a deformable member operatively coupled to said lever; and said frame bracket includes a hole, said hole being dimensioned to receive said deformable member when said deformable member is in a non-deformed condition, said deformable member being radially expansible upon displacement of said lever to prevent said deformable member from passing through said hole in said frame bracket.

15. The wheelchair battery mounting system of claim 14, wherein said coupling element is structured and configured to be adjustable to permit compresive force applied against said deformable member by said lever to be selectively increased and decreased.

16. The wheelchair battery mounting system of claim 1, further comprising:

an upper cross tube having opposing ends;

a pair of battery box lid brackets, each one of said battery box lid brackets being attached to one of said opposing ends of said upper cross tube;

said coupling element further including a pair of coupling elements, each one of said coupling elements being supported by one of said battery box lid brackets; and a pair of frame brackets, each one of said frame brackets being attached to one of the side frames;

wherein said battery box lid has a top, and a trough in said top located in said rear end of said battery box lid, said upper cross tube is fastened to said rear end of said battery box lid in said trough, and each one of said coupling elements is engageable with one of said frame brackets to hold said rear end of said battery box lid in a substantially fixed position relative to the side frames.

17. The wheelchair battery mounting system of claim 16, wherein each one of said coupling elements includes a lever and a deformable member operatively coupled to said lever; and each one of said frame brackets includes a hole, said hole in each one of said frame brackets being dimensioned to receive one of said deformable members when said deformable members are in a non-deformed condition, said deformable members being radially expansible upon displacement of said levers to prevent said deformable members from passing through said hole in each one of said frame brackets.

18. The wheelchair battery mounting system of claim 17, wherein said coupling element is structured and configured to be adjustable to permit compressive force applied against said deformable member by said lever to be selectively increased and decreased.

19. A wheelchair battery mounting system for use with a wheelchair having side frames and front and rear cross tubes spanning between the side frames, said battery mounting system comprising:

a battery cage comprising a front end and a rear end, said rear end of said battery cage being substantially fixed relative to the wheelchair side frames;

a battery box including:

a battery box bottom supported by said battery cage, said battery box bottom having a front end and a rear end, said rear end of said battery box bottom being substantially fixed relative to said rear end of said battery cage; and a battery box lid having a top, a front end and a rear end, said battery box lid having a trough in said top of said battery box lid, said front end of said battery box lid being engageable with said front end of said battery box bottom;

an upper cross tube having opposing ends, said upper cross tube being fastened to said rear end of said battery box lid in said trough;

a pair of battery box lid brackets, each one of said battery box lid brackets being attached to one of said opposing ends of said upper cross tube;

a pair of coupling elements, each one of said coupling elements being supported by one of said battery box lid brackets; and a pair of frame brackets, each one of said frame brackets being attached to one of the side frames;

wherein each one of said coupling elements is engageable with one of said frame brackets to hold said rear end of said battery box lid in a substantially fixed position relative to the side frames.

20. A wheelchair comprising:

a wheelchair frame including:

a pair of spaced apart side frames; and a front cross tube and a rear cross tube spanning between said side frames; and a battery mounting system comprising:

a battery box including:

a battery box bottom having a front end and a rear end, said battery box bottom being substantially fixed relative to said wheelchair side frames; and a battery box lid having a front end and a rear end, said front end of said battery box lid being engageable with said front end of said battery box bottom; and a coupling element structured and dimensioned to couple said rear end of battery box lid to said side frames so as to hold said rear end of said battery box lid in a substantially fixed position relative to said rear end of said battery box bottom.

* * * * *